Dec. 18, 1962 W. G. DION ETAL 3,069,536
LIGHT PROJECTOR
Filed Dec. 7, 1959 2 Sheets-Sheet 2

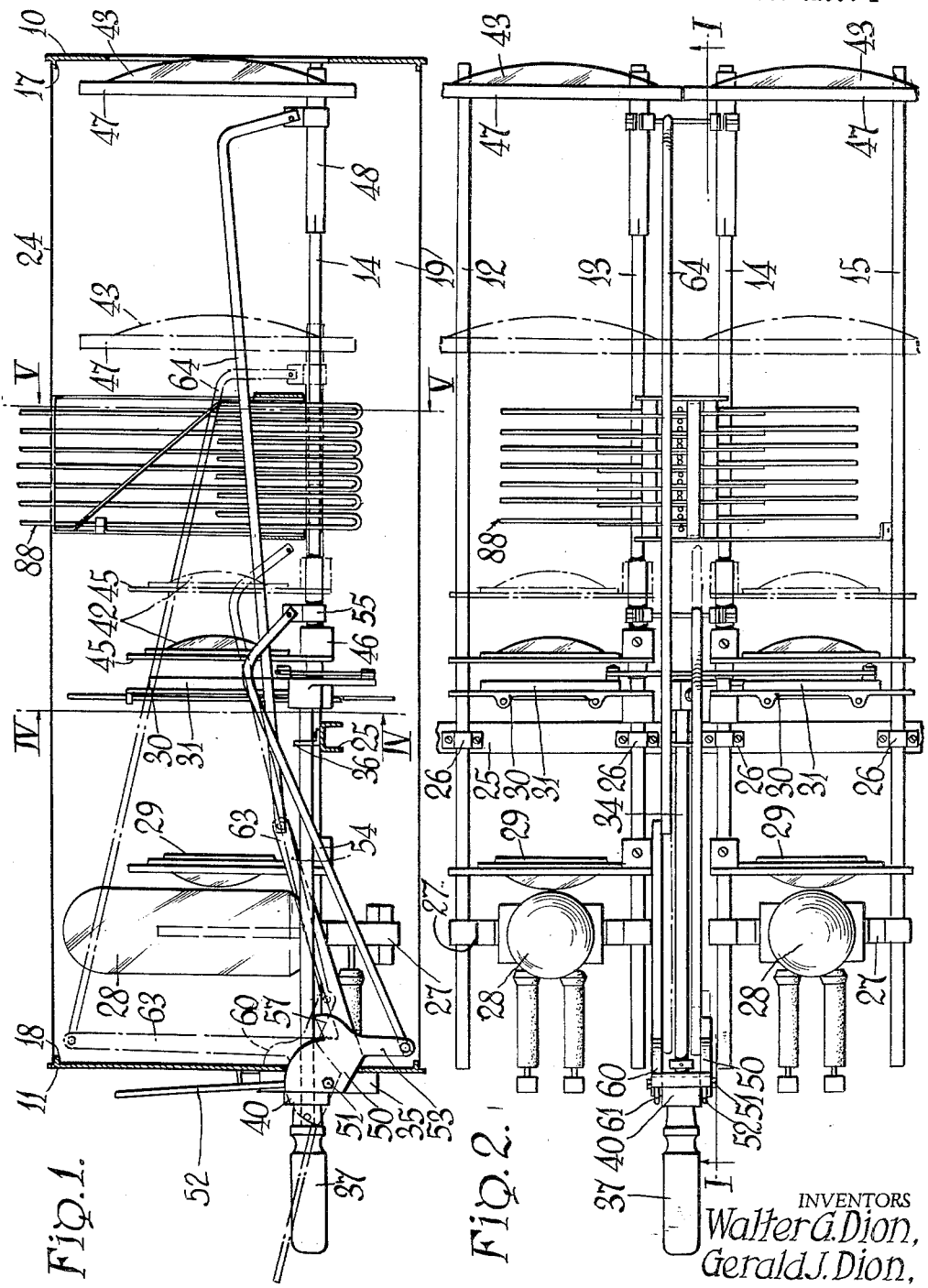

INVENTORS
Walter G. Dion,
Gerald J. Dion,
BY Bean, Brooks, Buckley & Bean
ATTORNEYS 3,069,536
LIGHT PROJECTOR
Walter G. Dion and Gerald J. Dion, both of
78 Amber St., Buffalo, N.Y.
Filed Dec. 7, 1959, Ser. No. 857,906
4 Claims. (Cl. 240—3)

This invention relates to illuminating apparatus of the type generally known in the art as a theatrical spotlight. More particularly, the present invention provides an improved spotlight arrangement for producing a "spot" of light of any desired diameter in a more efficient, a more effective, and a more flexible manner than in theatrical spotlights of the prior art.

A common method of varying the diameter of a light beam or spot in theatrical spotlights is by means of an iris diaphragm which provides a variable diameter aperture for varying the diameter of the projected beam. This method is wasteful of light, particularly in smaller diameter spots, in which case only a very small percentage of the light from the light source is usefully employed in the beam or spot.

To avoid this wastefulness, and for other reasons, our prior Patent No. 2,347,771, dated May 2, 1944 shows a spotlight wherein the iris diaphragm is eliminated and the diameter of the beam or spot is varied by adjusting the relative axial positions of a pair of lenses which concentrate the light impinging on the lens system from the light source to a greater or less degree to vary the diameter of the projected beam or spot. By this means a uniform quantity of light from the light source is employed in the projected beam regardless of the diameter of the beam.

This latter method is very effective within certain limits but it has been found that to produce very small spots of light in this manner is impractical since it would require too great a range of lens movement and would therefore necessitate a spotlight of such overall length as to be entirely impractical.

The spotlight of the present invention combines the advantages and capabilities of the foregoing two methods of varying the light beam diameter in a novel manner and by means which render the operation foolproof, that is, by means which automatically insures a desired and predetermined sequence of operation. For effective and efficient operation it is essential that the lens adjustment system be utilized to adjust the spot diameter from a maximum down to a predetermined diameter and that the iris diaphragm be used for this purpose for further adjustment from such predetermined diameter down to zero diameter or the minimum aperture of the iris diaphragm.

The mechanical arrangement of the spotlight of the present invention is such that both the lens focusing or axial adjustment method and the iris diaphragm adjustment method can each be used only within their relative ranges of optimum effectiveness. More specifically, the iris diaphragm must be fully open before the lenses can be adjusted axially to vary the spot diameter and, conversely, the iris diaphragm cannot be adjusted unless the lenses are at their positions of maximum spacing which produces the smallest spot possible by use of the lens shifting mode of adjustment.

In a preferred form of the present invention the compound lens means for varying the spot diameter comprises a pair of lens elements and manual means are provided whereby both lens elements may be conveniently simultaneously adjusted axially toward and away from each other in a manner which produces the desired relative axial movement of each of the lens elements with respect to the other but which permits independent manual adjustment of either lens element for trimming or sharp focusing.

A further object of the present invention is attained by the provision of relatively simple means for mounting a series of color filter elements in conjunction with means for readily selecting a desired filter element and interposing the same in the light path.

The foregoing and other objects of the present invention will become apparent to those skilled in the present art from a consideration of the form of spotlight illustrated in the accompanying drawings and described in detail in the following specification. However, it is to be understood that such embodiment is set forth only to illustrate the principles of the present invention and that various mechanical modifications may be introduced without departing from the spirit of the invention, the scope of which is limited only as defined in the appended claims.

In the drawings:

FIG. 1 is a longitudinal cross-sectional view taken on the line I—I of FIG. 2;

FIG. 2 is a skeletonized top plan view of the mechanism of FIG. 1 with the casing members omitted;

Figure 4:
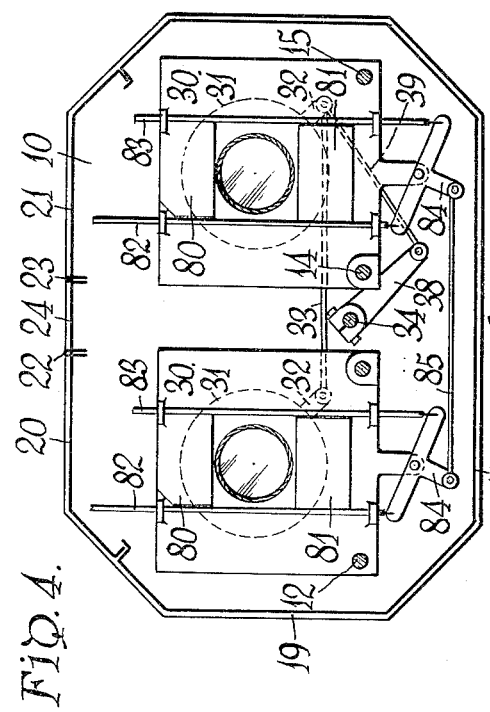
FIG. 4 is a cross-sectional view taken generally on the line IV—IV of FIG. 1.

Like characters of reference denote like parts throughout the several figures of the drawing and the numerals 10 and 11 designate front and rear end walls. The front and rear end walls are held in rigid spaced relationship by means of four rods designated 12, 13, 14 and 15 in FIG. 2. These rods are securely fixed at their ends to the respective end walls 10 and 11 to provide a rigid structural framework and the rods 12 through 15 further support the major portion of the internal mechanism of the apparatus, as will presently appear.

The front and rear end wall members 10 and 11 are provided adjacent to their margins with inwardly directed flanges designated 17 and 18, respectively, in FIG. 1, and bottom, top and side casing wall forming members are attached to the flanges 17 and 18. In the present instance the bottom and side wall forming sheet metal portions are designated collectively by the numeral 19 and a pair of upper cover portions 20 and 21 are longitudinally hinged as at 22 and 23, respectively, to a top wall member 24, to give access to the interior of the casing for any desired purpose.

A transverse brace member 25 extends between the side walls of the casing and the rods 12 through 15 are supported thereon and secured thereto as indicated at 26 in FIG. 2.

In the present instance, the principles of the present invention are illustrated in a dual spotlight wherein there are two light sources and two duplicate sets of jointly operated control devices for securing a desired degree of illuminating intensity with standard light source means. By this means lamps with a filament size which permits a relatively small image thereof at the focal plane, and consequently more effective utilization of the light therefrom, may be employed.

Brackets 27 clamped to the rods 12 through 15 support incandescent lamps 28 at one end of the apparatus and condensing lenses 29, likewise attached to the rods 12 through 15, project light from the lamps 28 forwardly and focuses the same at a predetermined focal plane which coincides with the plane of a pair of apertures defined by iris diaphragms which will now be described.

Forwardly of the condensing lenses 29 and likewise attached to the bars 12 through 15 are support plates 30 which support generally conventional iris diaphragm devices 31 whose apertures are adapted to be adjusted by operation of rock arms 32 shown in FIG. 4. The aperture adjusting rock arms 32 of the two iris diaphragm mechanisms are pivotally connected for joint operation by a link 33. A rotatable operating shaft for regulating the iris diaphragms 31 is designated 34 and is journaled at its ends in a bearing block 35 fixed to rear wall 11 and a bearing 36 on brace member 25.

At its outer end iris diaphragm control shaft 34 is provided with an operating handle 37 for rotating the same and at its inner or forward end with an arm 38 which is connected to one of the operating arms 32 of the iris diaphragm mechanisms 31 by means of a pivoted link 39. Accordingly, rotation of handle 37 and operating shaft 34 adjusts the diaphragm aperture between maximum and minimum limit positions. A rectangular block 40 is fixed to operating shaft 34 rearwardly of the rear wall 11 of the casing and performs an interlocking function which will presently be described.

Each of the dual spotlight units includes, forwardly of the iris diaphragm mechanism 31, compound lens means consisting of a relatively short focus lens 42 and a relatively long focus lens 43 which have a resultant focus at the plane of the iris diaphragm 31 and which project the beam of light from the associated conjugate condensing lens 29 in such manner as to vary the spot of light reaching a given objective, such as an act or scene on a stage, by adjustment of the axial positions of the lenses 42 and 43.

When the short and long focus lenses are farthest apart, as indicated in full lines in FIGS. 1 and 2, the spot of light produced by cooperation of the lenses 42 and 43 is of minimum diameter, insofar as the same is controllable by axial positioning of the lenses, and when the lenses are brought closest to each other, as indicated in dot and dash lines in FIG. 1, the spot is of maximum diameter.

The short focus lenses 42 include mounting plates 45 having slide bearings 46 which are slidably mounted on the rods 12 through 15 and the long focus lenses 43 have a support plate 47 which includes slide bearings 48 likewise mounted on rods 12 through 15.

The means for adjusting the lenses 42 and 43 in axial directions to vary the spot diameter will now be described. Referring first to the short focus lenses 42, a rocker member 50 is pivoted to bearing block 35 as at 51 in FIG. 1 and is provided with an operating rod 52. An arm 53 projecting from rocker member 50 is connected by means of a pivotal link 54 with bearings 46 as by means of collars 55. Accordingly, if an operator pulls rearwardly on operating rod 52 the short focus lens 42 is adjusted axially forwardly from the full line position of FIG. 1 to the dot and dash line position. Rearward movement of operating rod 52 is limited by a lug 57 on rocker member 50 which engages the rear wall 11 to limit the forward movement of lens 42.

A similar rocker member 60 is pivoted to the other side of bearing block 35 and has an operating rod 61. Rocker member 60 has an arm 63 and the outer end thereof is connected to the slide bearings 48 of long focus lenses 43 by a pivoted link 64. Rearward movement of operating rod 61 is limited by engagement of arm 63 against rear wall 11 and this determines the rearward limit position of long focus lens 43 as indicated in dot and dash lines in FIGS. 1 and 2.

The relationship of the lenses is such that in moving from the full line positions of FIG. 1 to the dot and dash line positions the short focus lens 42 should move more rapidly at the first part of its movement than at the last part, while the long focus lens 43 should move rearwardly at a slower rate at the first part of its rearward movement and then more rapidly toward the rearward limit.

This desired relative movement is conveniently and simply effected by substantially equal rearward movements of the operating rods 52 and 61, since the harmonic movements imparted to the links 54 and 64 by the arms 53 and 63, respectively, naturally accomplish this desired relationship of axial movements. Therefore, for general purposes an operator may merely grasp both operating rods 52 and 61 with one hand and move them rearwardly and forwardly equal amounts to secure various spot diameters within the range afforded by the lens system. Nevertheless the operator may move either of the operating rods 52 or 61 individually and independently of the other to trim the adjustment and secure sharper focus.

The rectangular block 40 which is fixed to iris diaphragm control shaft 34 adjacent to bearing block 35 is of substantially the same width as the bearing block 35. When the block 40 is in a vertical position, which condition obtains only when the iris diaphragms 31 are fully open, the rocker members 50 and 60 may be freely adjusted in a pivotal manner by means of the operating rods 52 and 61, either jointly or independently. If block 40 is not in this vertical position, that is if the iris diaphragms 31 are not fully open, it will be noted that the vertical rear surface of the rocker members 50 and 60 will be blocked by the block 40 and operation of the lens adjustment means from the full line position of FIG. 1 cannot be effected.

Similarly, once either or both of the rocker members have been moved from the full line position of FIG. 1 with the rectangular block 40 in the vertical position, it will be impossible for an operator to rotate handle 37 to move the iris diaphragms from their fully open positions since such operation is prevented by engagement of the side walls of the rectangular block 40 against the adjacent walls of one or both of the rocker members 50 and 60.

Each of the iris diaphragm members 31 is provided with upper and lower masking plates designated 80 and 81, respectively, in FIG. 4. Masking plate 80 is attached to a vertical rod 82 and masking plate 81 is attached to a vertical rod 83. The rods 82 and 83 are mounted for vertical sliding movement against the rear faces of the iris diaphragm support plates 30 and their lower ends are pivoted to bell crank members 84, as clearly shown in FIG. 4, a connecting link 85 being provided to synchronize the rocking movements of the bell cranks 84.

Rocking movement of the bell cranks 84 in a counterclockwise direction as viewed in FIG. 4 from the position there shown lowers the upper masking plate 80 and raises the lower masking plate 81. This may be employed to cut off the top and bottom of the spot to various degrees when lateral spread of the spot is desired and the plates 80 and 81 may also be completely closed to provide dousers for the spots. Any suitable external means for operating the masking plate bell crank linkage may be provided. Such control means is not novel to the present invention and accordingly need not be further illustrated.

The exemplary form of spotlight structure illustrated herein includes a relatively simple selectable color filter arrangement. In FIGS. 1 and 2 the numeral 88 designates generally a series of pairs of color filters adapted to be selectively interposed between the short focus lenses 42 and the long focus lenses 43 and one such filter holding and positioning mechanism is shown in detail in the fragmentary perspective view, FIG. 6.

Figure 5:
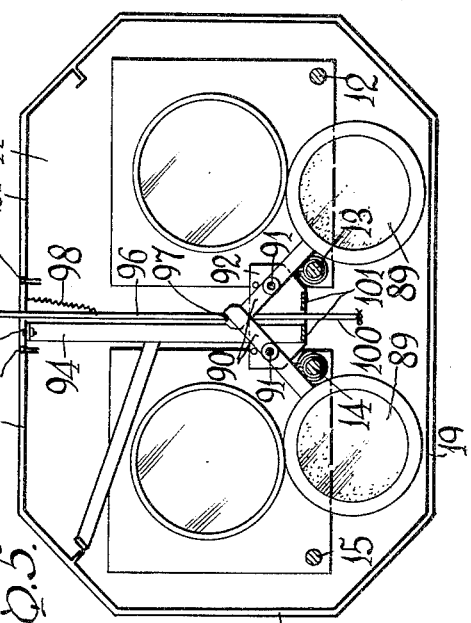
FIG. 5 is a cross-sectional view taken approximately on the line V—V of FIG. 1.
Figure 3:
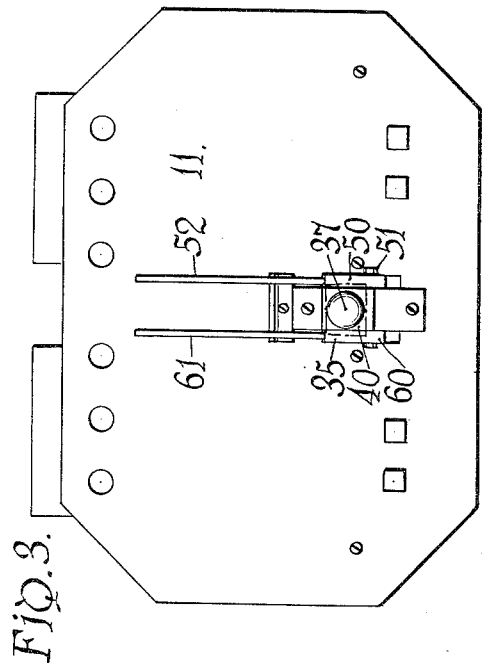
FIG. 3 is a rear end elevation of the device of FIGS. 1 and 2.
Figure 6:
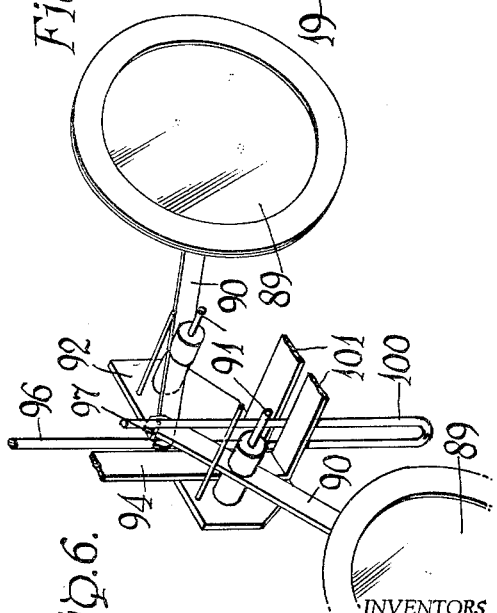
FIG. 6 is a fragmentary detail perspective view of one of the color filter units of the apparatus.

Referring to FIGS. 5 and 6, the numeral 89 designates a pair of identical color filter elements which are fixed to the ends of levers 90 which are pivoted on shafts 91. The shafts 91 are supported at their ends in bearing plates 92 which in the present instance are suspended from the top wall member 24 as by brackets 94. The filter elements normally remain in their position of non-use as illustrated in FIG. 5 under the force of gravity wherein they may merely rest on the bottom casing wall.

The levers 90 cross at their inner ends as illustrated in FIGS. 5 and 6 and a generally vertical operating rod 96 for each pair of color filter elements 89 is provided with a cross pin 97 which engages in the crotch formed at the upper sides of the crossed levers 90. Extension coil springs 98 normally hold the several rods 96 in their upper positions, as illustrated in FIG. 5, but any desired rod may be depressed and moved slightly laterally to engage a notch 99 thereof in the edge of the opening through top wall member 24 through which the rod 96 projects.

The lower end of each operating rod 96 has a return bent portion 100 and the several return bent portions extend between bars 101 associated with the lower ends of the bearing plates 92 to guide the rods 96 vertically in conjunction with the openings in the top wall member 24. Thus any desired pair of filter elements may be moved upwardly into axial alinement with the light beam by depressing its associated operating rod 96 and moving the same slightly laterally to engage the notch 99 beneath the top wall member 24 and thus hold the pair of filter elements 89 in operative position.

We claim:

1. In light projection apparatus, a light source, lens means for projecting light from said source in beam form, means mounting said lens means for adjustment in an axial direction with respect to said beam to vary the diameter of the projected beam selectively between predetermined maximum and minimum diameters, aperture means in alignment with said light source and said lens means and means movable to adjust the aperture means to adjust the diameter of said beam to various diameters below said predetermined minimum diameter, a first member movable with said lens means between maximum and minimum diameter positions of said lens means, a second member movable with said aperture adjusting means between a position corresponding to said minimum beam diameter and positions corresponding to less beam diameters, said first means being provided with means engaging and preventing movement of said second means when said first means is in other than said minimum beam position, said second means being provided with means engaging and preventing movement of said first means when said second means is in other than said minimum beam position, whereby the lens means is adjustable only when the aperture means is in its maximum diameter position and the aperture means is adjustable only when the lens means is in its minimum beam diameter position.

2. In light projection apparatus, a light source, light condensing means for projecting light from said source in beam form, lens means in the path of said beam and adapted to refract the same to vary the diameter of a projected spot of light, means mounting said lens means for adjustment in an axial direction with respect to said beam to vary the diameter of said spot of light selectively between predetermined maximum and minimum diameters, aperture means in alignment with said light source and said lens means and means movable to adjust the aperture means to adjust the spot of light to various diameters below said predetermined minimum diameter, a first member movable with said lens means between maximum and minimum diameter positions of said lens means, a second member movable with said aperture adjusting means between a position corresponding to said minimum beam diameter and positions corresponding to less beam diameters, said first means being provided with means engaging and preventing movement of said second means when said first means is in other than said minimum beam position, said second means being provided with means engaging and preventing movement of said first means when said second means is in other than said minimum beam position, whereby the lens means is adjustable only when the aperture means is in its maximum diameter position and the aperture means is adjustable only when the lens means is in its minimum beam diameter position.

3. In light projection apparatus, a light source, lens means for projecting light from said source in beam form, means mounting said lens means for adjustment in an axial direction with respect to said beam to vary the diameter of the projected beam selectively between a predetermined diameter and larger diameters, aperture means in alignment with said light source and said lens means and means movable to adjust the aperture means to adjust the diameter of said beam to various diameters below said predetermined diameter, a first member movable with said lens means between various diameter positions of said lens means, and a second member movable with said aperture adjusting means between various diameter positions of said aperture means, said first means being provided with means engaging and preventing movement of said second means when said first means is in other than said predetermined diameter position, said second means being provided with means engaging and preventing movement of said first means when said second means is in other than said predetermined diameter position.

4. In light projection apparatus, a light source, light condensing means for projecting light from said source in beam form, lens means in the path of said beam and adapted to refract the same to vary the diameter of a projected spot of light, means mounting said lens means for adjustment in an axial direction with respect to said beam to vary the diameter of said spot of light selectively between a predetermined diameter and larger diameters, aperture means in alignment with said light source and said lens means and means movable to adjust the aperture means to adjust said spot of light to various diameters below said predetermined diameter, a first member movable with said lens means between various diameter positions of said lens means, and a second member movable with said aperture adjusting means between various diameter positions of said aperture means, said first means being provided with means engaging and preventing movement of said second means when said first means is in other than said predetermined spot diameter position, said second means being provided with means engaging and preventing movement of said first means when said second means is in other than said predetermined spot diameter position.

References Cited in the file of this patent

UNITED STATES PATENTS

| | | |
|---|---|---|
| 1,691,475 | Hall | Nov. 13, 1928 |
| 2,009,145 | Nathan | July 23, 1935 |
| 2,192,520 | Levy et al. | Mar. 5, 1940 |
| 2,347,771 | Dion et al. | May 2, 1944 |
| 2,650,292 | Strong | Aug. 25, 1953 |